United States Patent

Lehman

[11] Patent Number: 5,957,488
[45] Date of Patent: Sep. 28, 1999

[54] AIR BAG COVER WITH HORN SWITCH

[75] Inventor: Robert R. Lehman, Clawson, Mich.

[73] Assignee: TRW Vehicle Safety Systems Inc., Lyndhurst, Ohio

[21] Appl. No.: 08/960,380

[22] Filed: Oct. 29, 1997

[51] Int. Cl.$^6$ .................................................... B60R 21/16
[52] U.S. Cl. ........................................ 280/731; 200/61.54
[58] Field of Search .............................. 280/728.2, 728.3, 280/731, 735; 200/61.54

[56] References Cited

U.S. PATENT DOCUMENTS

| | | | |
|---|---|---|---|
| 5,265,904 | 11/1993 | Shelton et al. | 280/731 |
| 5,369,232 | 11/1994 | Leonelli | 200/61.54 |
| 5,399,819 | 3/1995 | Lang et al. | 200/61.54 |
| 5,585,606 | 12/1996 | Ricks | 200/61.54 |
| 5,590,902 | 1/1997 | Eckhout | 280/728.3 |
| 5,762,365 | 6/1998 | Worrell et al. | 280/731 |

*Primary Examiner*—Paul N. Dickson
*Attorney, Agent, or Firm*—Tarolli, Sunheim, Covell Tummino & Szabo

[57] ABSTRACT

An apparatus (10) for covering an inflatable vehicle occupant protection device (40) comprises a cover (70) movable from a closed condition to an open condition upon inflation of the inflatable vehicle occupant protection device (40). The cover (70) includes first and second portions (100, 110). The first cover portion (100) is movable relative to the second cover portion (110). A membrane switch (130) in an electric circuit for actuating an electrically actuatable device (132) of the vehicle includes a first switch portion (140) underlying the first cover portion (100) and a second switch portion (142) underlying the second cover portion (110). The first cover portion (100) is manually engageable to operate the first switch portion (140) and thereby to actuate the electrically actuatable device (132). The second cover portion (110) is manually engageable to operate the second switch portion (142) and thereby to actuate the electrically actuatable device (132). A first back plate (150) for the first switch portion (140) is connected for movement with the first cover portion (100) and with the first switch portion (140). A second back plate (160) for the second switch portion (142) is connected with the second cover portion (110). The second switch portion (142) is movable with the first switch portion (140) relative to the second cover portion (110) and to the second back plate (160) in response to movement of the cover (70) from the closed condition to the open condition.

14 Claims, 3 Drawing Sheets

AIR BAG COVER WITH HORN SWITCH

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

b 2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. U.S. Pat. No. 5,585,606 discloses a membrane type horn switch which is connected with an air bag module cover. The horn switch includes two active parts, each secured for movement with a respective movable part of the cover. When the air bag inflates, a rupturable portion of the switch tears to enable the movable cover parts to open so that the air bag can inflate out of the cover.

SUMMARY OF THE INVENTION

The present invention is an apparatus for covering an inflatable vehicle occupant protection device. The apparatus comprises a cover movable from a closed condition to an open condition upon inflation of an inflatable vehicle occupant protection device. The cover includes first and second portions. The first cover portion is movable relative to the second cover portion. The apparatus includes a membrane switch in an electric circuit for actuating an electrically actuatable device of the vehicle. The membrane switch includes a first switch portion underlying the first cover portion and a second switch portion underlying the second cover portion. The first cover portion is manually engageable to operate the first switch portion and thereby to actuate the electrically actuatable device. The second cover portion is manually engageable to operate the second switch portion and thereby to actuate the electrically actuatable device. The apparatus includes a first back plate for the first switch portion and means for connecting the first back plate and the first switch portion for movement with the first cover portion. The apparatus also includes a second back plate for the second switch portion and means for connecting the second back plate with the second cover portion. The second switch portion is movable with the first switch portion relative to the second cover portion and to the second back plate in response to movement of the cover from the closed condition to the open condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
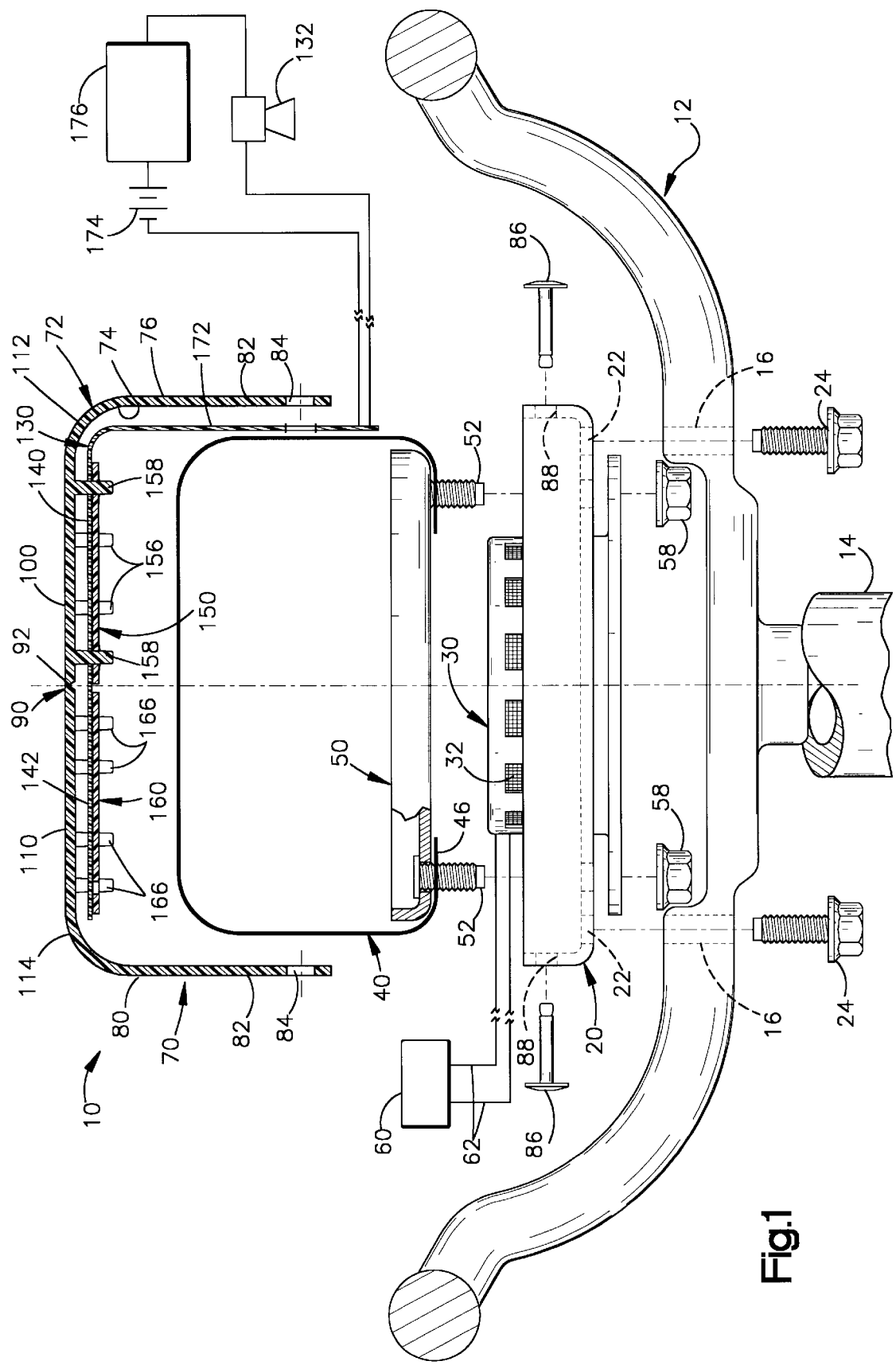
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 80 of the cover. A mounting flange or mounting portion 82 of the cover 70 extends from the main body portion 72 in a direction toward the base plate 20. A plurality of first fastener openings 84 are formed in the mounting portion 82 of the cover 70. Rivets 86 extend through the fastener openings 84 in the mounting portion 82 of the cover 70 and through fastener openings 88 in the base plate 20.

An I-shaped tear seam 90 (FIG. 2) is formed in the main body portion 72 of the cover 70. The tear seam 90 includes a central or base section 92 and four side sections 94, 96, 98 and 102. The tear seam 90 constitutes a weakened portion of the cover 70 which is rupturable under the force of the inflating air bag 40 to enable the air bag to inflate out of the cover.

The tear seam 90 partially defines first and second movable parts 100 and 110 of the cover. Each one of the first and second movable cover parts 100 and 110 has a generally rectangular configuration. The base 92 and the side sections 94 and 96 of the tear seam 90 extend along three sides of the first movable cover part 100. A first hinge portion 112 of the cover 70 extends along the fourth side of the first movable cover part 100, between the two side sections 94 and 96 of the tear seam 90. The first hinge portion 112 connects the first movable cover part 100 to the fixed cover part 80 for pivotal movement relative to the fixed cover part.

The base 92 and the other two side sections 98 and 102 of the tear seam 90 extend along three sides of the second movable cover part 110. A second hinge portion 114 of the cover 70 extends along the fourth side of the second movable cover part 110, between the two side sections 98 and 102 of the tear seam 90. The second hinge portion 114 connects the second movable cover part 110 to the fixed cover part 80 for pivotal movement relative to the fixed cover part.

The air bag module 10 includes a switch 130 for actuating an electrically actuatable device of the vehicle, such as a vehicle horn indicated schematically at 132 (FIG. 1). In the preferred embodiment, the switch 130 is a single membrane switch of a known type which includes first and second layers of electrically conductive material (not shown) normally separated by a dielectric material. The layers of conductive material are supported on a non-conducting substrate material. The layers of conductive material are engageable with each other, in response to the application of force to the switch 130, to complete a circuit in the switch.

The switch 130 includes first and second switch portions 140 and 142 located on opposite sides of an imaginary centerline 144. The first and second switch portions are not electrically or physically discrete portions, but are referred to herein as separate portions, or areas, of the single switch 130 for purposes of correspondence to the first and second movable cover parts 100 and 110. The first and second layers of conductive material of the switch 130, as well as the substrate material, extend continuously over both portions 140 and 142 of the switch.

The first switch portion 140 underlies the first cover part 100. Five fastener openings 146 are formed in the first switch portion 140.

A rigid first back plate 150 is located at a position underlying the first switch portion 140. (The spacing between the first movable cover part 100, the first switch portion 140, and the first back plate 150 is exaggerated, for clarity, in FIG. 1.) Thirteen fastener openings 152 and 154 are formed in the first back plate 150. Five of the thirteen fastener openings, designated 152 in FIG. 2, underlie the first switch portion 140 and align with the five fastener openings 146 in the first switch portion. The remaining eight fastener openings in the first back plate 150, designated 154 in FIG. 2, do not underlie the second switch portion.

Thirteen fasteners in the form of pins 156 and 158 extend inward from the first movable cover part 100. Eight of the thirteen pins, designated 156 in FIG. 2, extend through the eight fastener openings 154 in the first back plate 150. The pins 156 have a press fit in the fastener openings 154 in the first back plate 150 and securely fasten the first back plate to the first movable cover part 110.

Figure 2:
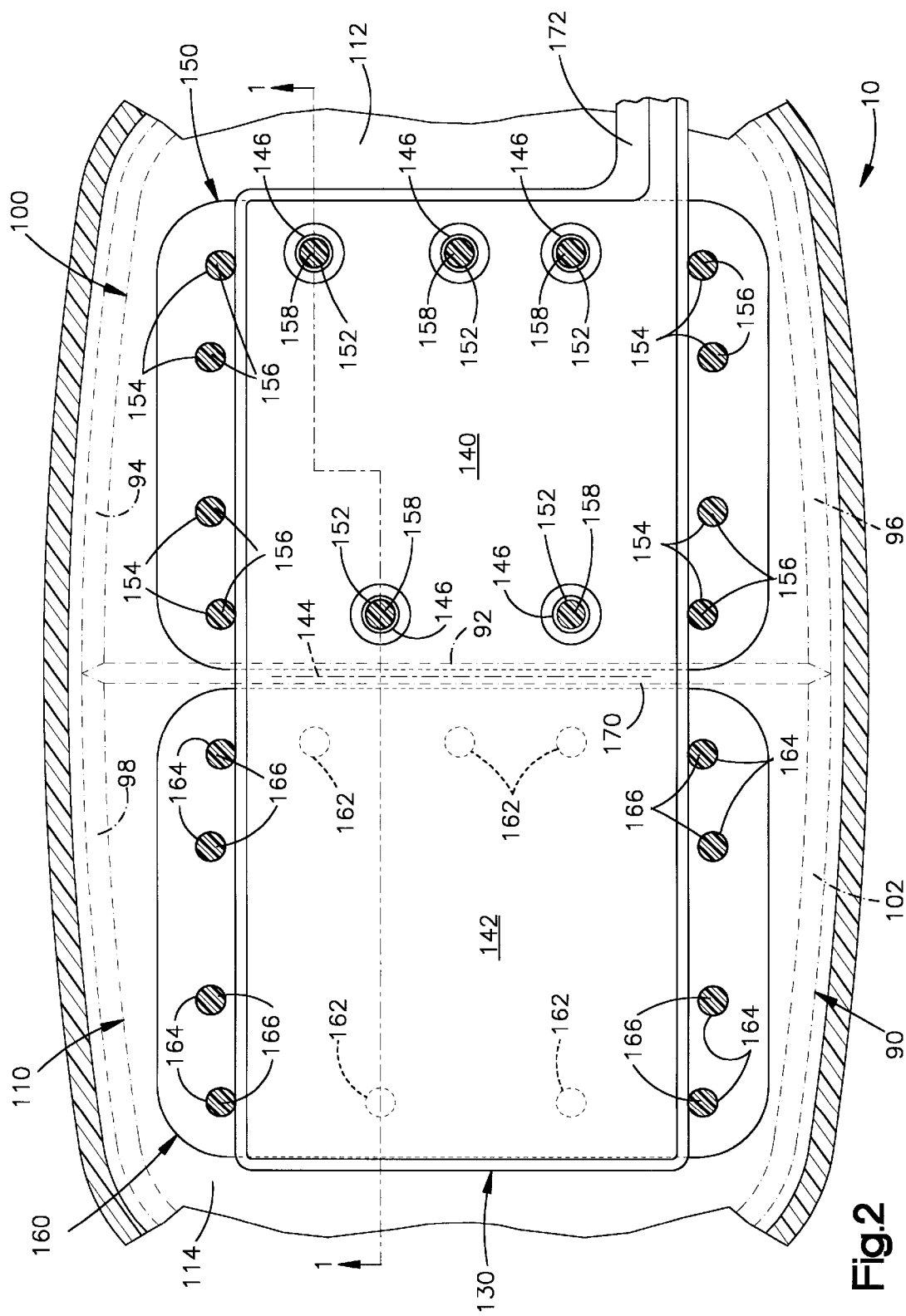
FIG. 2 is a schematic plan view of portions of the air bag module of FIG. 1 including the horn switch.
Figure 3:
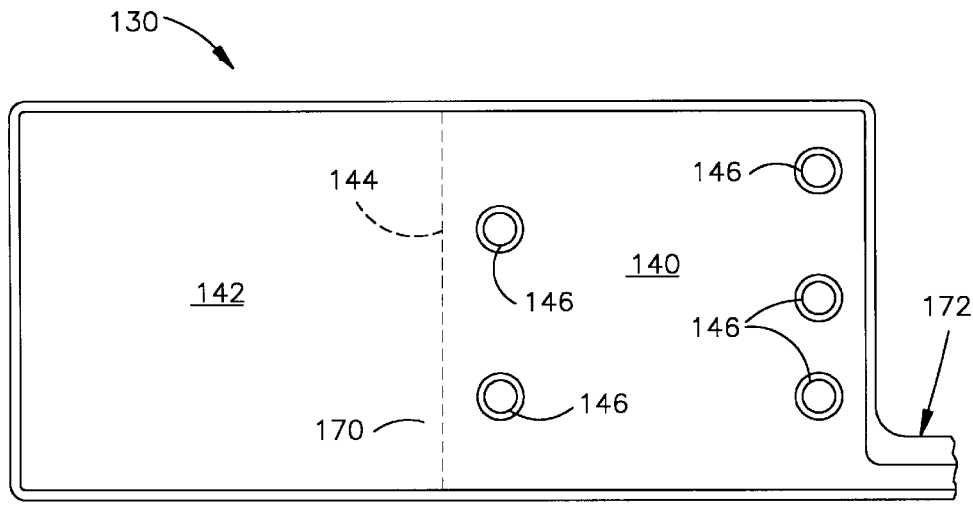
FIG. 3 is a plan view of the horn switch.

The remaining five of the thirteen pins, designated 158 in FIG. 2, extend with a clearance fit through the fastener openings 146 in the first switch portion 140 and into the fastener openings 152 in the first back plate 150. The pins 158 have a press fit in the fastener openings 152 in the first back plate 150 and help to fasten the first back plate securely to the first movable cover part 110. The pins 158 maintain the first switch portion 140 in position between the first back plate 150 and the inner side surface of the first movable cover part 100.

The first back plate 150 provides a relatively rigid support for the first switch portion 140, so that force applied to the first cover part 100 can result in operation of the first switch portion of the switch 130. The first back plate 150 and the first switch portion 140 are movable with the first movable cover part 100 upon opening of the cover 70.

The second switch portion 142 underlies the second moveable cover part 110. There are no fastener openings in the second switch portion 142.

A rigid second back plate 160 is located at a position underlying the second switch portion 142. The second back plate 160 is identical in construction to the first back plate, to provide commonality of parts in manufacture. Thus, the second back plate 160 includes eight fastener openings 164 which do not underlie the second switch portion 142, as well as five fastener openings 162 which do underlie the second switch portion.

Eight pins 166 extend inward from the second movable cover part 100. The pins 166 extend through the eight fastener openings 164 in the second back plate 160. The pins 166 have a press fit in the fastener openings 164 in the second back plate 150 and securely fasten the second back plate 160 to the second movable cover part 110. The second back plate 160 is thereby movable with the second movable cover part 110.

All of the pins 166 on the second movable cover portion 110 are disposed outside the second switch portion 142. Thus, no pins 166 from the second movable cover part 110 extend through the second switch portion 142.

The second switch portion 142 has a slip fit between the second movable cover part 110 and the second back plate 160. The close spacing between the second movable cover part 110, the second switch portion 142, and the second back plate 160 maintains the second switch portion in position between the second back plate and the inner side surface of the second movable cover part 110. The second back plate 160 provides a relatively rigid support for the second switch portion 142, so that force applied to the second cover part 110 can result in operation of the second switch portion 142 of the switch 130.

An intermediate portion 170 of the switch 130, between the first and second switch portions 140 and 142, underlies or extends across the central part 92 of the tear seam 90. The intermediate portion 170 of the switch 130 is preferably electrically active. The intermediate portion 170 of the switch 130, as discussed below, is not rupturable upon movement of the cover 70 to the open condition.

A lead assembly 172 extends from the first switch portion 140, across the first hinge portion 112 of the cover 70, and into a position underlying the fixed portion 80 of the cover. The lead assembly 172 connects the switch assembly 130 with the vehicle horn 132, with a power source 174 such as the vehicle battery, and with vehicle electric circuitry indicated schematically at 176.

To effect operation of the vehicle horn 132, the driver of the vehicle presses on the cover 70 of the air bag module 10 in a downward direction as viewed in FIG. 1. The force applied to the cover 70 of the air bag module 10 is transmitted through the cover to the switch 130. Specifically, force applied to the first movable cover part 100 is transmitted to the first switch portion 140. The first switch portion 140 is operated, and the vehicle horn 132 is energized. When force is applied to the second movable cover part 110, the force is transmitted to the second switch portion 142, the second switch portion is operated, and the vehicle horn 132 is energized.

When the force on the cover 70 of the air bag module 10 is released, the resilience of the cover causes it to move away from the air bag 40. As this movement occurs, the switch 130 returns to its original condition. The electrical resistance of the switch 130 returns to its first level. This change in the resistance of the switch 130 is sensed by the vehicle electric circuitry 176, and the vehicle horn 132 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied toward the inside of the switch 130 and the cover 70. Specifically, the inflating air bag 40 pushes outward against the first and second back plates 150 and 160 and against the inner side surface 74 of the cover 70. The cover 70 opens along the I-shaped tear seam 90, which is the predetermined weakened portion of the cover. The first and second movable cover parts 100 and 110 move away from each other, pivoting about the hinge portions 112 and 114, respectively, through the partially open condition shown in FIG. 4 and to an open condition. The cover 70 opens sufficiently that the air bag 40 inflates between the first and second movable cover parts 100 and 110 into a position to help protect the vehicle occupant.

Figure 4:
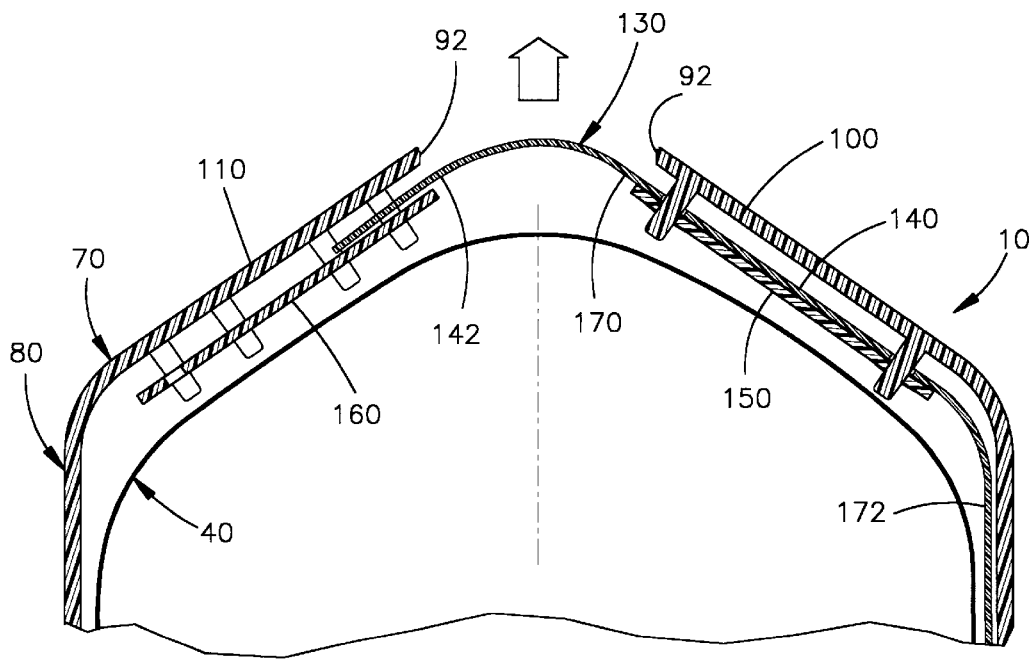
FIG. 4 is a view similar to FIG. 1 illustrating schematically a partially open condition of the air bag module.

When the cover 70 opens, the first movable cover portion 100 moves away from the second movable cover portion 110. The first switch portion 140 moves with the first movable cover part 100. As this movement occurs, the force of the moving first switch portion 140 is transmitted to the second switch portion 142. Because the second switch portion 142 is not secured to the second back plate 160 or to the second movable cover part 110, the second switch portion is pulled out from between the second movable cover part and the second back plate, as illustrated in FIG. 4. The switch 130 bends but does not break or rupture; specifically, the intermediate portion 170 of the switch does not rupture. The electrical connection between the switch portions 140 and 142 is maintained during and after movement of the cover 70 from the closed condition to the open condition.

The switch 130 can be used to actuate an electrically actuatable device of the vehicle other than the vehicle horn 132. For example, the switch 130 could be used to actuate or control the vehicle radio, speed control, etc. Alternatively, the switch 130 could have a plurality of electrically independent active areas for controlling a plurality of electrically actuatable devices including the vehicle horn 132.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, I claim:

1. An apparatus for covering an inflatable vehicle occupant protection device, comprising:

a cover being movable from a closed condition to an open condition upon inflation of an inflatable vehicle occupant protection device;

said cover including first and second portions, said first cover portion being movable relative to said second cover portion;

a membrane switch in an electric circuit for actuating an electrically actuatable device of the vehicle, said membrane switch including a first switch portion underlying said first cover portion and a second switch portion underlying said second cover portion;

said first cover portion being manually engageable to operate said first switch portion and thereby to actuate said electrically actuatable device, said second cover portion being manually engageable to operate said second switch portion and thereby to actuate said electrically actuatable device;

a first back plate for said first switch portion and means for connecting said first back plate and said first switch portion for movement with said first cover portion;

a second back plate for said second switch portion and means for connecting said second back plate with said second cover portion; and means for enabling said second switch portion to move with said first switch portion relative to said second cover portion and to said second back plate in response to movement of said cover from the closed condition to the open condition.

2. An apparatus as set forth in claim 1 wherein said cover includes a fixed portion, said first and second cover portions being movable relative to said fixed portion and to each other, said second back plate being connected for movement with said second cover portion relative to said first back plate and to said first cover portion.

3. An apparatus as set forth in claim 1 wherein said cover has a tear seam defining said first and second portions of said cover, said membrane switch having an intermediate portion extending across said tear seam, said intermediate portion of said membrane switch electrically interconnecting said first switch portion and said second switch portion when said cover is in the closed condition and when said cover is in the open condition.

4. An apparatus as set forth in claim 3 wherein said tear seam has an I-shaped configuration, each one of said first and second cover portions having a generally rectangular configuration defined by three sections of said tear seam and a respective hinge portion of said cover.

5. An apparatus as set forth in claim 3 wherein said intermediate portion of said switch electrically interconnects said first and second switch portions when said cover is in the closed condition and when said cover is in the open condition.

6. An apparatus as set forth in claim 1 wherein said means for connecting said first back plate for movement with said first cover portion comprises a plurality of first fasteners on said first cover portion extending through fastener openings in said first switch portion and into first fastener openings in said first back plate.

7. An apparatus as set forth in claim 6 wherein said means for connecting said second back plate with said second cover portion comprises a plurality of second fasteners on said second cover portion extending into second fastener openings in said second back plate, said second switch portion being free of fastener openings.

8. An apparatus as set forth in claim 1 wherein said second switch portion has a slip fit between said second back plate and said second cover portion.

9. An apparatus as set forth in claim 1 wherein said switch has a plurality of fastener openings in said first switch portion and said second switch portion is free of fastener openings.

10. An apparatus as set forth in claim 1 wherein said first switch portion pulls said second switch portion out from between said second cover portion and said second back plate upon movement of said cover from the closed condition to the open condition.

11. An apparatus for covering an inflatable vehicle occupant protection device, comprising:

a cover having an I-shaped tear seam defining a fixed portion and first and second movable portions of said cover, said tear seam having a central section disposed between said first and second movable cover portions;

said first and second movable cover portions being connected with said fixed cover portion by respective first and second hinge portions of said cover to enable movement of said cover from a closed condition to an open condition upon inflation of the inflatable device; and a single membrane switch in an electric circuit for actuating an electrically actuatable device of the vehicle, said single membrane switch including a first switch portion underlying said first movable cover portion and a second switch portion underlying said second movable cover portion;

said first movable cover portion being manually engageable to operate said first switch portion and thereby to actuate said electrically actuatable device, said second movable cover portion being manually engageable to operate said second switch portion and thereby to actuate said electrically actuatable device;

said membrane switch having a non-rupturing intermediate portion extending across said central section of said tear seam and electrically interconnecting said first switch portion and said second switch portion when said cover is in the closed condition and when said cover is in the open condition.

12. An apparatus as set forth in claim 11 wherein said intermediate portion of said membrane switch is formed as one piece with said first and second switch portions.

13. An apparatus as set forth in claim 11 comprising a first back plate fixed for movement with said first movable cover portion and a second back plate fixed for movement with said second movable cover portion and relative to said first back plate.

14. An apparatus as set forth in claim 13 wherein said second switch portion has a slip fit between said second back plate and said second cover portion.

* * * * *